US007349852B2

United States Patent
Cosatto et al.

(10) Patent No.: US 7,349,852 B2
(45) Date of Patent: *Mar. 25, 2008

(54) SYSTEM AND METHOD OF PROVIDING CONVERSATIONAL VISUAL PROSODY FOR TALKING HEADS

(75) Inventors: Eric Cosatto, Highlands, NJ (US); Peter Graf Hans, Lincroft, NJ (US); Thomas M. Isaacson, Huntingtown, MD (US); Franz Storm Volker, Jersey City, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/237,561

(22) Filed: Sep. 28, 2005

(65) Prior Publication Data

US 2006/0074689 A1    Apr. 6, 2006

Related U.S. Application Data

(63) Continuation of application No. 10/173,341, filed on Jun. 17, 2002, now Pat. No. 7,076,430.

(60) Provisional application No. 60/380,952, filed on May 16, 2002.

(51) Int. Cl.
*G10L 11/00* (2006.01)
(52) U.S. Cl. .................. 704/275; 704/276; 704/262
(58) Field of Classification Search ................ None
See application file for complete search history.

(56) References Cited

U.S. PATENT DOCUMENTS

| 4,884,972 A | 12/1989 | Gasper |
| 5,652,828 A | 7/1997 | Silverman |
| 5,983,190 A * | 11/1999 | Trower et al. ............. 704/276 |
| 6,081,780 A | 6/2000 | Lumelsky et al. |
| 6,112,177 A | 8/2000 | Cosatto et al. |
| 6,212,502 B1 * | 4/2001 | Ball et al. .................. 704/270 |
| 6,389,396 B1 * | 5/2002 | Lyberg ..................... 704/258 |
| 6,665,643 B1 * | 12/2003 | Lande et al. ............... 704/266 |
| 6,735,566 B1 * | 5/2004 | Brand ....................... 704/256 |
| 2005/0033582 A1 * | 2/2005 | Gadd et al. ................ 704/277 |

FOREIGN PATENT DOCUMENTS

| WO | PCT/IL99/00056 | * | 8/1999 |
| WO | WO 99/39281 | * | 8/1999 |

OTHER PUBLICATIONS

Ball et al., in "Embodied Conversational Agents," MIT press 2000, pp. 189-219.*
Cassell et al., "Embodiment in conversational Interfaces: Rea," Chi 99, May 1999, pp. 520-527.*

(Continued)

*Primary Examiner*—V. Paul Harper

(57) ABSTRACT

A system and method of controlling the movement of a virtual agent while the agent is listening to a human user during a conversation is disclosed. The method comprises receiving speech data from the user, performing a prosodic analysis of the speech data and controlling the virtual agent movement according to the prosodic analysis.

15 Claims, 11 Drawing Sheets

OTHER PUBLICATIONS

Hayes-Roth et al., "Desigining for Diversity: Multi-Cultural Characters for a Multi-Cultural World," Proceedings of Imagina, Feb. 2002.*

Kakumanu et al., "Speech Driven Facial Animation," Proceedings of the 2001 Workshop on Preceptive user Interfaces, Nov. 2001, Orlando Florida.*

Lavagetto, F. et al., "Converting Speech into Lip Movements: A Multimdia Telephone for Hard of Hearing People," IEEE Transactions on Rehabilitation Engineering, vol. 3, No. 1, Mar. 1995.*

Marquis, et al., "Emotionally responsive poker playing agents," in Notes for Twelfth National Conference on Artificial Intelligence, AAAI-94 Workshop on Artificial Intelligence, Artificial Life, and Entertainment, AAAI 1994.*

Ball et al. "Emotion and Personality in a Conversational Agent" editor J. Cassell in Embodied Conversational Agents, MIT press, 2000, pp. 189-219.*

Hayes-Roth et al. "Designing for Diversity: Multi-Cultural Characters For a Mulit-Cultural World" Proceedings of Imagina, Feb. 2002.*

Marquis et al. "Emotionally responsive poker playing agents," in notes for the Twelfth National Conference on Artificial Intelligence AAAI-94 Workshop on Artificial Intelligence, Artificial Life, and Entertainment, AAAI 19994.*

"The ToBI Annotation Conventions", Beckman, M., Herschberg, J., http://www.ling.ohio-state.edu/phonetics/ToBI/ToBI6.html.

"Embodied Conversational Agents", Cassell, J., Sullivan, J. Prevost, S., Churchill, E., (eds.) *MIT Press*, Cambridge, 2000.

"Photo-Realistic Talking Heads from Image Samples", by Cosatto, E., and Graf, H. P., *IEEE Trans. Multimedia*, pp. 152-163, Sep. 2000.

"Face Analysis for the Synthesis of Photo-Realistic Talking Heads", by Graf, H. P., Cosatto, E., and Essat, T., *Proc. Fourth IEEE Int. Conf. Automatic Face and Gesture Recognition*, Grenoble, France, IEEE Computer Society, Los Alamitos, 2000, pp. 189-194.

"The Timing of Shifts in Head Postures During Conversation", by Hadar, U., Steiner, T. J., Grant, E. C., Rose, F. C., *Human Movement Science*, 3, pp. 237-245, 1984.

"Spoken Language Processing", by Huang X., Acero, A., Hon, H., *Prentice Hall*, 2001, pp. 739-791.

"Computer Facial Animation" by Parke, F.I., Waters, K., *A., K. Peters*, Wellesley, Massachusetts, 1997.

"ToBI: A Standard for Labeling English Prosody", by Silverman, K., Beckman, M., Pitrelli, J., Osterndorf, M., Wrightman, C., Price, P., Pierrehumbert, J., Herschberg, J., *Int. Conf. on Spoken Language Processing*, 1992, Banff, Canada, pp. 867-870.

"Inter-transcriber reliability and ToBI Prosodic Labeling" by Syrdal, A. K., and McGory, J., *ICSLP 2000*, Beijing, China; vol. 3, pp. 235-238.

"Visual Prosody: Facial Movements Accompanying Speech" by Graf, Hans Peter, Cosatto, Eric, Strom, Volker and Huang, Fu Jie, *AT&T Labs Research*, 200 Laurel Ave., South, Middletown, NJ 07748.

"Soft Machine: A Personable Interface", by Lewis, J., Purcell, P., Architecture Machine Group, Massachusetts Institute of Technology, Cambridge, MA 02139.

* cited by examiner

*FIG. 2*

| SYMBOL OF PITCH ACCENT | MOVEMENT OF THE PITCH OF THE FUNDAMENTAL FREQUENCY (F0) |
|---|---|
| H* | HIGH-UPPER END OF THE PITCH RANGE. |
| !H* | DOWN-STEPPED HIGH; SOMEWHAT LOWER THAN H. |
| L+H* | LOW, MOVING HIGH. |
| L* | LOW-LOWER END OF PITCH RANGE. |
| | |
| PHRASE BOUNDARY | MOVEMENTS OF (F0) |
| H-H% | PITCH HIGH AND RISING HIGHER TOWARDS END; TYPICAL FOR YES - NO QUESTION. |
| L-H% | PITCH LOW AND RISING TOWARDS END; TYPICAL FOR COMMA. |
| L-L% | PITCH LOW, STAYING LOW; TYPICAL FOR END OF A STATEMENT. |

FIG. 5

| PITCH ACCENT | NUMBER OF EVENTS |
|---|---|
| H* | 7277 |
| L* | 29 |
| !H* | 367 |
| L+H* | 608 |
| PHRASE BOUNDARY | |
| L-L% | 664 |
| H*,L-L% | 712 |
| L-H% | 252 |
| H*,L-H% | 249 |
| H-H% | 9 |
| H*,H-H% | 13 |

FIG. 6

| TIME (END OF PHONE) ⟵200 | PHONE ⟵202 | PROSODIC EVENT ⟵204 | WORD ⟵206 |
|---|---|---|---|
| 0.63s | SIL | | silence |
| 0.77s | ay | | "I'm" |
| 0.85s | m | H* | |
| 0.90s | y | | your |
| 1.00s | er | none | |
| 1.05s | v | | virtual |
| 1.19s | or | H* | |
| 1.28s | ch | | |
| 1.33s | uw | none | |
| 1.36s | uh | | secretary |
| 1.41s | l | none | |
| 1.52s | s | | |
| 1.61s | eh | | |
| 1.67s | k | H* | |
| 1.71s | r | | |
| 1.74s | ih | none | |
| 1.84s | t | | |
| 1.94s | eh | | |
| 2.06s | r | none | |
| 2.20s | iy | L-L% | secretary |

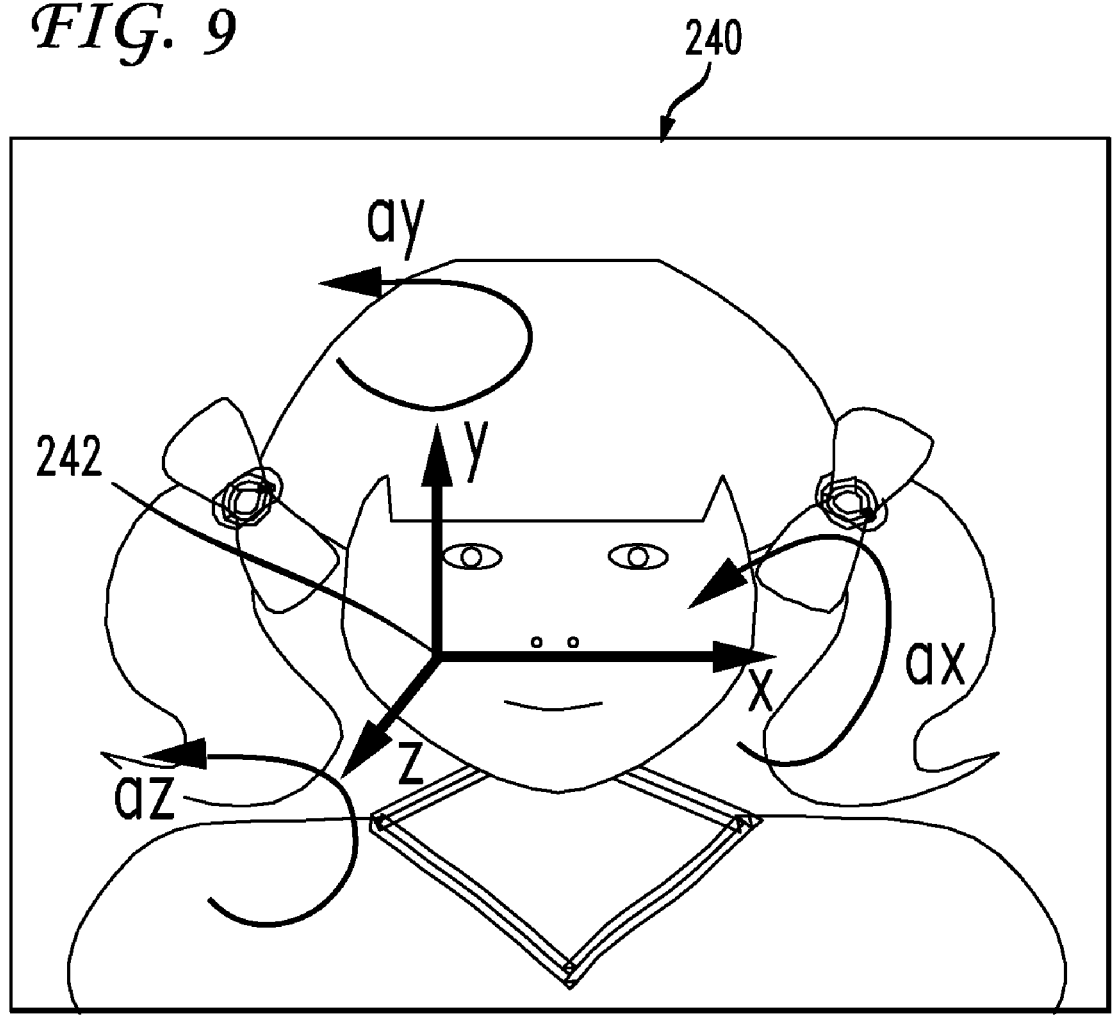

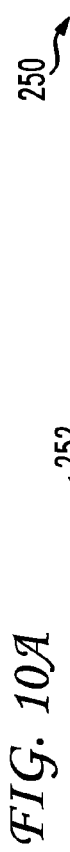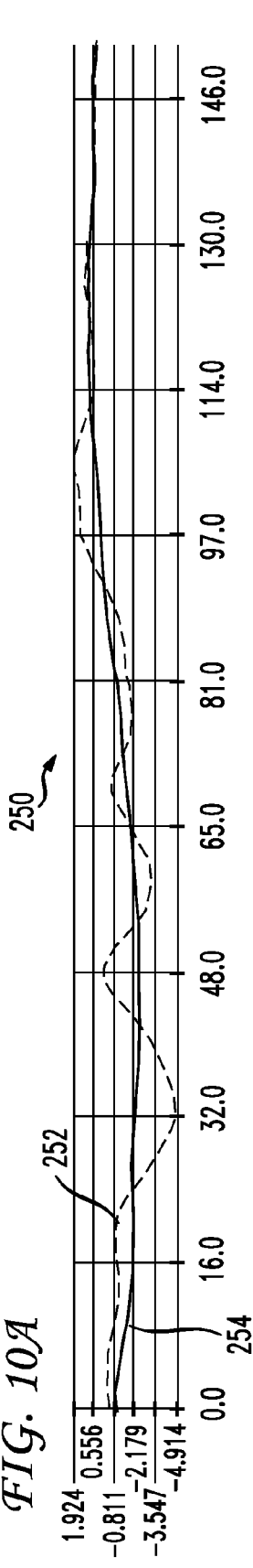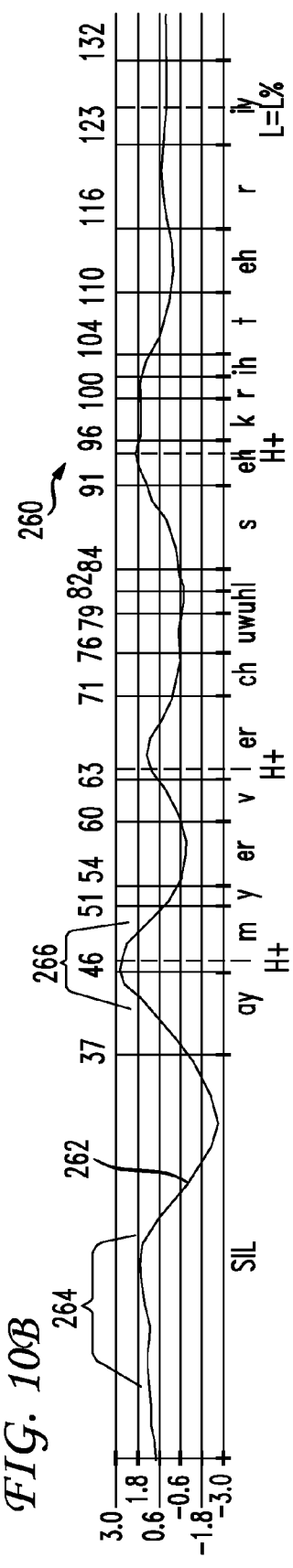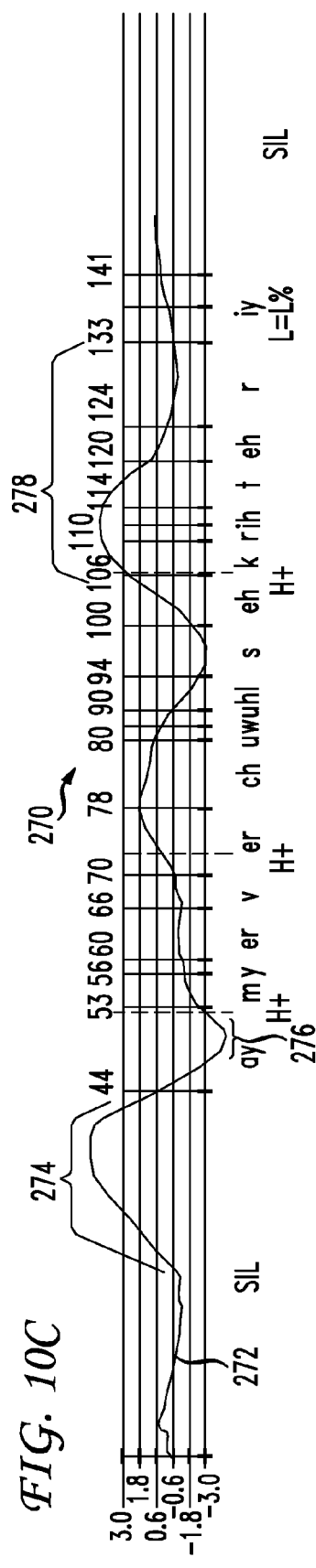
FIG. 10A
FIG. 10B
FIG. 10C

SYSTEM AND METHOD OF PROVIDING CONVERSATIONAL VISUAL PROSODY FOR TALKING HEADS

RELATED APPLICATIONS

The present application is a continuation of U.S. application Ser. No. 10/173,341, filed on Jun. 17, 2002 now U.S. Pat. No. 7,076,430 which claims priority to U.S. Provisional Application Ser. No. 60/380,952, filed on May 16, 2002. The present application is related to U.S. application Ser. No. 10/173,184, filed on Jun. 17, 2002. The contents of each of these related Applications are incorporated herein by reference.

BACKGROUND OF THE INVENTION

1. Field of the Invention

The present invention relates to controlling animations and more specifically to a system and method of providing reactive behavior to virtual agents when a human/computer interaction is taking place.

2. Discussion of Related Art

Much work has recently been focused on generating visual Text-to-Speech interactions between a human user and a computer device. The natural interaction between a computer and human is increasing as conversational agents or virtual agents improve, but the widespread acceptance and use of virtual agents is hindered by un-natural interactions with the virtual agent. Studies show that a customer's impression of a company's quality is heavily influenced by the customer's experience with the company. Brand management and customer relations management (CRM) drive much of a company's focus on its interaction with the customer. When a virtual agent is not pleasing to interact with, a customer will have a negative impression of the company represented by the virtual agent.

Movements of the head of a virtual agent must be natural or viewers will dislike the virtual agent. If the head movement is random, that impression is more synthetic. In some cases, the head appears to float over a background. This approach is judged by many viewers to be "eerie."

One can try to interpret the meaning of the text with a natural language understanding tool and then derive some behavior from that. Yet, such an approach is usually not feasible, since natural language understanding is very unreliable. A wrong interpretation can do considerable harm to the animation. For example, if the face is smiling while articulating a sad or tragic message, the speaker comes across as cynical or mean spirited. Most viewers dislike such animations and may become upset.

An alternative approach is to use 'canned' animation patterns. This means that a few head motion patterns are stored and repeatedly applied. This can work for a short while, yet the repetitive nature of such animations soon annoys viewers.

Yet another approach is to provide recorded head movements for the virtual agent. While this improves the natural look of the virtual agent, unless those head movements are synchronized to the text being spoken, to the viewer the movements become unnatural and random.

Movement of the head of a virtual agent is occasionally mentioned in the literature but few details are given. See, e.g., Cassell, J, Sullivan, J. Prevost, S., Churchill, E., (eds.), "Embodied Conversational Agents", MIT Press, Cambridge, 2000; Hadar, U., Steiner, T. J., Grant, E. C., Rose, F. C., "The timing of shifts in head postures during conversation", Human Movement Science, 3, pp. 237-245, 1984; and Parke, F. I., Waters, K., "Computer Facial Animation", A. K. Peters, Wellesley, Mass., 1997.

Some have studied emotional expressions of faces and also describe non-emotional facial movements that mark syntactic elements of sentences, in particular endings. But the emphasis is on head movements that are semantically driven, such as nods indicating agreement. See, e.g., Ekman, P., Friesen, W. V., "Manual for the Facial Action Coding System", Consulting Psychologists Press, Palo Alto, 1978.

Conventionally, animations in virtual agents are controlled through interpretation of the text generated from a spoken dialog system that is used by a Text-to-Speech (TTS) module to generate the synthetic voice to carry on a conversation with a user. The system interprets the text and manually adds movements and expressions to the virtual agent.

Yet another attempt at providing virtual agent movement to illustrated by the FaceXpress development product available for virtual agents offered through LifeFX®. The FaceXpress is a tool that enables a developer to control the expression of the virtual agent. FIG. 1 illustrates the use of the tool 10. In this web-based version of the virtual agent development tool the developer of the virtual agent organizes preprogrammed gestures, emotions and moods. Column 12 illustrates the selected dialog 14, gestures 16 and other selectable features such as punctuators 32, actions 34, attitudes 36 and moods 38. Column 18 illustrates the selectable features. Shown is column 18 when the gestures option is selected to disclose the available pre-programmed gestures smile 20, frown 40 and kiss 42. The developer drags the desired gesture from column 18 to column 22. Column 22 shows the waveform of the text 24, a timing ruler 44, the text spoken by the virtual agent 26 and rows for the various features of the agent, such as the smile 28. A moveable amplitude button 46 enables the developer to adjust the parameters of the smile feature. While this process enables the developer to control the features of a virtual agent, it is a time-consuming and costly process. Further, the process clearly will not enable a real-time conversation with a virtual agent where every facial movement must be generated live. With the increased capability of synthetic speech dialog systems being developed using advanced dialog management techniques that remove the necessity for preprogrammed virtual agent sentences, the opportunity to pre-program virtual agent movement will increasingly disappear.

The process of manually adding movements to the virtual agent is a slow and cumbersome process. Further, quicker systems do not provide a realistic visual movement that is acceptable to the user. The traditional methods of controlling virtual agent movement preclude the opportunity of engaging in a realistic interaction between a user and a virtual agent.

SUMMARY OF THE INVENTION

What is needed in the art is a new method of controlling head movement in a virtual agent such that the agent's movement is more natural and real. There are two parts to this process: (1) controlling the head movements of the virtual agent when the agent is talking; and (2) controlling the head movements when the virtual agent is listening. The related patent application referenced above relates to item (1). This disclosure relates to item (2) and how to control head movements when the virtual agent is listening to a human speaker.

The present invention utilizes prosody to control the movement of the head of a virtual agent in a conversation with a human. Prosody relates to speech elements such as pauses, tone, pitch, timing effects and loudness. Using these elements to control the movement of the virtual agent head enables a more natural appearing interaction with the user.

One embodiment of the invention relates to a method of controlling the virtual agent that is listening to a user. The method comprises receiving speech data from the user, performing a prosodic analysis of the speech data, and controlling the virtual agent movement according to the prosodic analysis.

Other embodiments of the invention include a system or apparatus for controlling the virtual agent movement while listening to a user and a computer-readable medium storing a set of instructions for operating a computer device to control the head movements of a virtual agent when listening to a user.

The present invention enables animating head movements of virtual agents that are more convincing when a human is having an interactive conversation. When the facial expressions and head movements of the virtual agent respond essentially simultaneously to the speech of the user, the agent appears more like a human itself. This is important for producing convincing agents that can be used in customer service applications, e.g. for automating call centers with web-based user interfaces.

Being able to control the facial expressions and head movements automatically, without having to interpret the text or the situation, opens for the first time the possibility of creating photo-realistic animations automatically. For applications such as customer service, the visual impression of the animation has to be of high quality in order to please the customer. Many companies have tried to use visual text-to-speech in such applications, but failed because the quality was not sufficient.

BRIEF DESCRIPTION OF THE DRAWINGS

The foregoing advantages of the present invention will be apparent from the following detailed description of several embodiments of the invention with reference to the corresponding accompanying drawings, in which:

FIG. 2 illustrates ToBI symbols used in marking pitch accents and phrase boundaries in prosody;

FIG. 5 illustrates tables of pitch accents and phrase boundaries for a data set;

FIG. 6 illustrates the phonetic transcript with annotations of a sentence;

FIG. 9 illustrates a coordinate system used when providing movement to a virtual agent;

FIG. 10A shows an example of the head angel ax as a function of time;

FIG. 10B illustrates a high-pass filtered part of a signal in FIG. 11A;

FIG. 10C shows the same sentence spoken as in FIG. 11B, but with the instruction to talk with a cheerful expression.

DETAILED DESCRIPTION OF THE INVENTION

Figure 1:
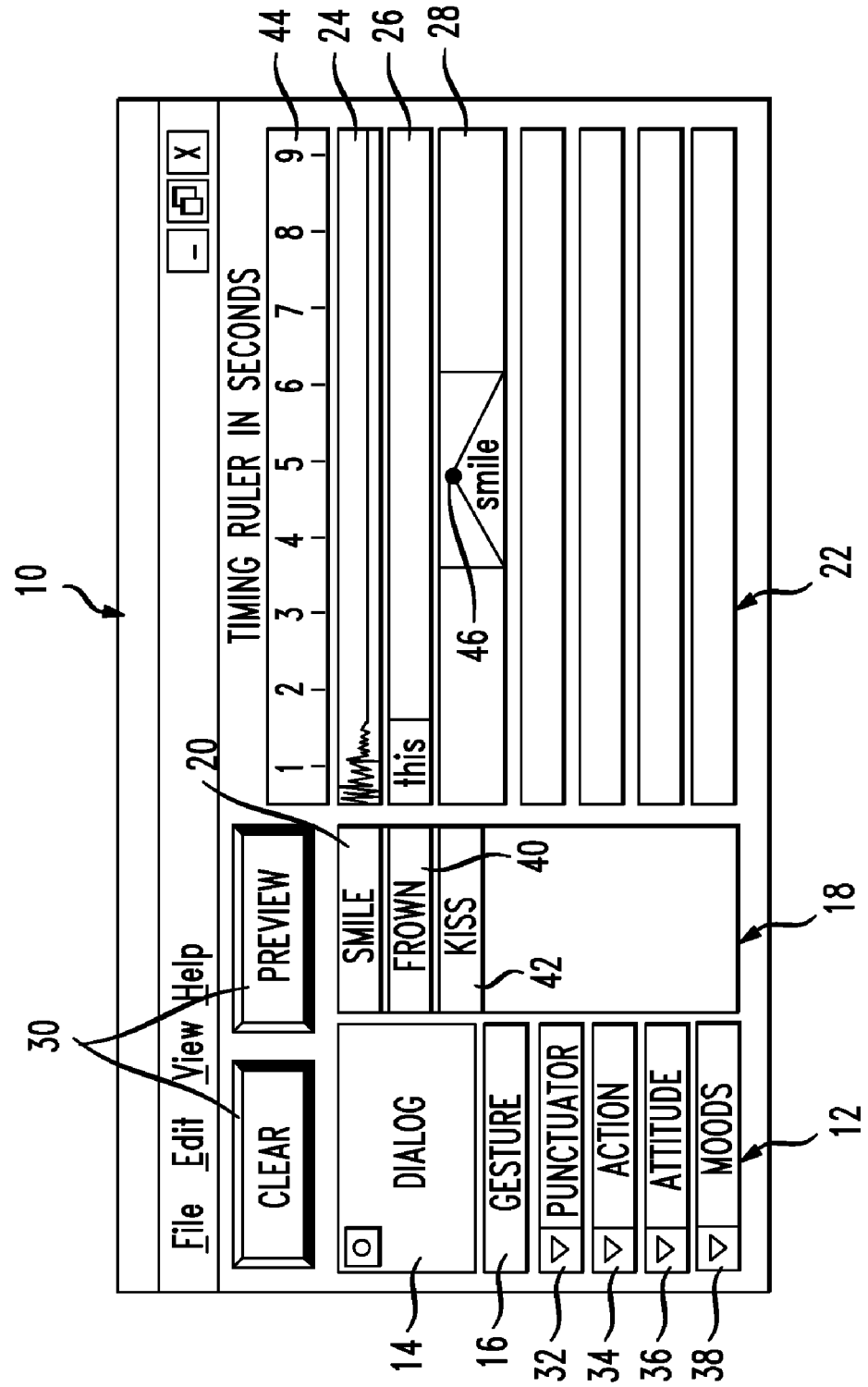
FIG. 1 illustrates a prior art method of generating gestures in a virtual agent.

In human-to-human conversations, many visual cues aid in the exchange of information and whose turn it is to speak. For example, when a first person is speaking and is about to finish, his or her facial expression and head movement provides visual cues that are recognized by the listener as indicating that it is the listener's turn to talk. Further, while the first person is speaking, the listener will often exhibit head motions such as nodding or smiling at the appropriate time to indicate that the words or meanings provided by the first person are heard and understood.

These kinds of very natural movements for humans that assist in an efficient and natural conversation are difficult to replicate when a human is speaking to a virtual animated entity or virtual agent.

Head movements, facial expressions, and gestures, applied by the speaker for underlining the meaning of the text, usually accompany speech. Such movements aid the understanding of the spoken text, but they also convey a lot of additional information about the speaker, such as the emotional state or the speaker's temper.

Mostly psychologists have studied nonverbal components in face-to-face communication extensively. Such studies typically link head and facial movements or gestures qualitatively to parts of the text. Many of the more prominent movements are clearly related to the content of spoken text or to the situation at hand. For example, much of the body language in conversations is used to facilitate turn taking. Other movements are applied to emphasize a point of view. Some movements serve basic biological needs, such as blinking to wet the eyes. Moreover, people always tend to move slightly to relax some muscles while others contract. Being completely still is unnatural for humans and requires considerable concentration.

Beside movements that are obviously related to the meaning of the text, many facial expressions and head shifts are tied more to the text's syntactic and prosodic structure. For example, a stress on a word is often accompanied by a nod of the head. A rising voice at the end of a phrase may be underlined with a rise of the head, possibly combined with rising eyebrows. These are the type of facial and head movements used according to the present invention. Since they are analogous to prosody in speech analysis, these kinds of facial and head movements are called "visual prosody."

Speech prosody involves a complex array of phonetic parameters that express attitude, assumptions, and attention and can be represented as a parallel channel of information to the meaning of the speech. As such, prosody supports a listener's recovery of the basic message contained in speech as well as the speaker's attitude toward the message and the listener as well.

Little information exists about prosodic movements, and no quantitative results have been published that show how such head and facial movements correlate with elements of speech.

The object of the present invention is to synthesize naturally looking virtual agents and especially to synthesize a listening virtual agent as well as a virtual agent transitioning from listening to talking or from talking to listening. The virtual agent may be a person or any kind of entity such as an animal or other object like a robot.

Many of the classical animation techniques have only limited applicability for the types of talking heads we describe here. Artists have been able since a long time to express emotions and personality in cartoon characters with just a few strokes of a pen. See, e.g., Culhane, S, "Animation; From Script to Screen", Martin's Press, New York, 1988.

However, as talking heads look more and more like real, recorded humans, viewers become more critical of small deviations from what is considered natural. For example, a cartoon character needs only very rough lip-sound synchronization to be perceived as pleasant. A photo-realistic head, on the other hand, has to show perfect synchronization. Otherwise the depicted person may seem to have a speech disability, which may be embarrassing to a viewer.

Emulating human behavior perfectly requires an understanding of the content of the text. Since many of the movements are closely coupled to prosodic elements of the text, the present invention relates to deriving naturally looking head movements using just the prosodic information.

Prosody describes the way speech is intonated with such elements as pauses, pitch, timing effects, and loudness. The details of the intonation are influenced by the personality of the speaker, by the emotional state, as well as by the content of the text. Yet, underneath personal variations lie well-defined rules that govern the intonation of a language. See, e.g. Huang, X., Acero, A., Hon, H., *Spoken Language Processing*, Prentice Hall, 2001, pp. 739-791, incorporated herein. Predicting the prosody from text is one of the major tasks for text-to-speech synthesizers. Therefore, fairly reliable tools exist for this task.

The text according to the present invention can be recorded or received from a number of sources. For example, (1) text can be recorded from short sentences, such as the one shown in FIG. 7 below, plus greetings; (2) Sentences designed to cover all diphones in English; (3) Short children's stories; and (4) Paragraphs of the Wall Street Journal. As can be understood, text can come from any source.

In order to practice the present invention, a database may need to be developed. For example, a database containing about 1,075 sentences was compiled from recordings of six different speakers. Five speakers talked for about 15 minutes each, pronouncing text from the first two sources. The sixth speaker is recorded for over two hours, articulating the whole data set. In this latter case the speaker is also instructed to speak some of the text while expressing a number of different emotions.

A prosodic prediction tool identifies prosodic phrase boundaries and pitch accents on the whole database, i.e. labeled the expected prosody. These events are labeled according to the ToBI (Tones and Break Indices) prosody classification scheme. For more information on the ToBI method, see, e.g., M. Beckman, J. Herschberg, The ToBI Annotation Conventions, and K. Silverman, M. Beckman, J. Pitrelli, M. Osterndorf, C. Wightman, P. Price, J. Pierrehumbert, J. Herschberg, "ToBI: A Standard for Labeling English Prosody", *Int. Conf. on Spoken Language Processing*, 1992, Banff, Canada, pp. 867-870.

ToBI labels do not only denote accents and boundaries, but also associate them with a symbolic description of the pitch movement in their vicinity. The symbols indicate whether the fundamental frequency (F0) is rising or falling. The two-tone levels, high (H) and low (L), describe the pitch relative to the local pitch range.

FIG. 2 illustrates a first table having a symbol of pitch accent column 60 and a corresponding column 62 for the movement of the pitch of the fundamental frequency. For example, H* is a symbol of the pitch accent having a corresponding movement of the pitch of high-to-upper end of the pitch range. Similarly, L* is a pitch accent symbol indicating a low-to-lower end of a pitch range.

The second table in FIG. 2 illustrates a phrase boundary column 64 and a movement of the fundamental frequency column 66. This table correlates a phase boundary, such as H-H % to a movement of pitch high and rising higher toward the end; typical for yes-no question. From correlations such as this, the ToBI symbols for marking pitch accents and phrase boundaries can be achieved. These pitch accents and phase boundaries can be used to control the movement of the virtual agent while listening and speaking to a user.

A conversation with a talking head will appear natural only if not just the speaking, or active, portion of the conversation is animated carefully with appropriate facial and head movements, but also the passive, or listening part. Tests with talking heads indicate that one of the most frequent complaints relate to appropriate listening behavior.

The present invention addresses the issue of how to control the movement and expression on the face of an animated agent while listening. The invention solves the problem by controlling facial and head movements through prosodic and syntactic elements in the text entered by a user, i.e. the text that the talking head is supposed to listen to and 'understand'. Adding listening visual prosody, i.e. proper facial and head movements while listening, makes the talking head seem to comprehend the human partner's input.

Figure 3:
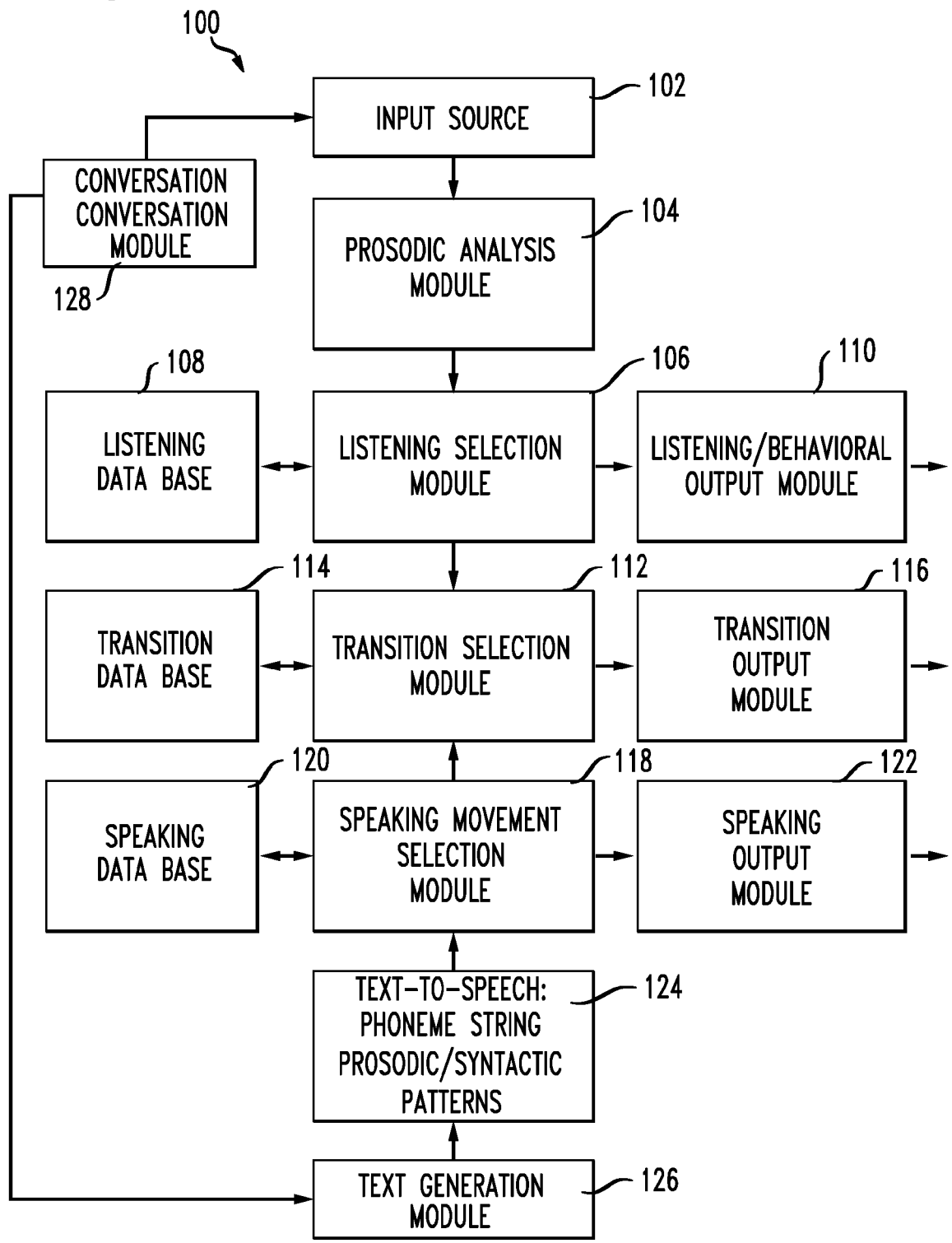
FIG. 3 illustrates an exemplary system for controlling movement of a virtual agent during a conversation with a user.

FIG. 3 illustrates a system 100 or apparatus for controlling a conversation between a user and a virtual agent, including the movement of the virtual agent while listening. As is known in the art, the various modules of the embodiments of the invention may operate on computer devices such as a personal computer, handheld wireless device, a client/server network configuration or other computer network. The particular configuration of the computer device or network, whether wireless or not, is immaterial to the present invention. The various modules and functions of the present invention may be implemented in a number of different ways.

Text or speech data is received from a source 102. The source may be words spoken by a user in a conversation with a virtual agent or from any other source. From this speech data, a prosodic analysis module 104 performs a syntactic analysis to determine and extract prosodic and syntactic patterns with the speech data.

After the prosodic structure of an utterance has been determined, this information has to be translated into movements of the head and facial parts. One way is to store many prosodic patterns and their corresponding head movements in a database. In a speaking, listening or transition mode for the virtual agent, when the system prepares to synthesize a sentence to be spoken by the virtual agent, the system searches for a sample in the database with similar prosodic events and select the corresponding head and facial movements. This produces very naturally looking animations. The aspect of the invention does require a large number of patterns have to be stored and the whole database has to be searched for every new animation.

The precise form of the head and facial movements is not critical and varies widely from person to person. What matters is that the movements are synchronized with the prosodic events. Such movements can be generated with a rule-based model or a finite state machine. For this approach, the inventors analyzed recorded sequences and determined the probability of particular head movements for each of the main prosodic events. For example, the system looks at how often a nod is happening on a stress, or a raised eyebrow at the end of a question. Using such a model, the system calculates for each prosodic event in the sequence the likelihood that a prominent head movement occurs. This model or rule-based approach can produce naturally looking sequences if enough samples are analyzed to determine all the probabilities properly. It has the advantage that it is computationally less costly than a sample-based approach.

Returning to FIG. 3, the prosodic data is transmitted to a selection module 106 that selects associated or matching prosody or syntactic patterns from a listening database 108. The listening database stores prosodic and syntactic patterns, as well as behavior patterns, that are appropriate for listening activity according to convention. Once the selection module 106 selects the behavior patterns, the patterns are transmitted to the virtual agent-rendering device as listening and behavioral face and head movements 110.

As an example, if a user were to elevate his voice in a conversation with another human, the listening person may naturally pull back and raise his eyebrows at the outburst. Similarly, the listening database will store such behavioral patterns for appropriate responses to the detected prosody in the speech data directed at the virtual agent.

Once the selection module 106 selects the behavioral patterns, the data is transmitted to the virtual agent in real-time to control the listening behavior, i.e., facial and head movements, of the virtual agent. For example, suppose a person is talking in a monotone voice for several minutes to the virtual agent. The behavior of the virtual agent according to the prosody of the monotone speech will be appropriate for such language. This may be, for example, minor movements and eye blinking. However, if the person suddenly yells at the virtual agent, the sudden change in the prosody of the speech would be immediately processed, and a change in the listening behavior pattern would shift in the virtual agent, and the virtual agent would exhibit a surprised or eyebrow-raising expression in response to the outburst.

In addition to listening and speaking behavior, there are also transition periods, which must be animated appropriately. When the input text 102 stops, the behavior has to switch to a 'planning' or 'preparation' stage, where it is clear that the head is getting ready for a response. Control moves from the listening selection module 106 to the transition selection module 112.

The selection module 112 controls the interaction between the transition database 114 and the movement of the virtual agent 116. The selection module 112 matches prosody and syntactic patterns drawn from a transition database 114. The transition database stores behavior patterns appropriate for transition behaviors. For example, when one speaker is done, certain movements of the head or behaviors will indicate the other person's turn to talk. If one person continues to talk and the other wants to speak, a certain transition visual behavior will indicate a desire to cut in and talk. Once the transition pattern is selected, the selection module 112 transmits the data to the virtual agent for controlling the behavioral facial and head movements in real-time for a more natural experience for the user.

Once a transition is complete, the conversation proceeds to the virtual agent's turn to talk. Here, the selection module 118 will receive a phoneme string having prosodic and syntactic patterns 124 from a text generation module 126.

Those of skill in the art are aware of means for text generation in the context of a spoken dialog service.

The speaking movement selection module 118 uses the prosodic and syntactic patterns from the generated text to select from a speaking database 120 the appropriate prosodic and syntactic behavioral patterns to control the speaking behavior and facial movements of the virtual agent 122. At the end of text output from the virtual agent, the virtual agent should signal to the viewer that now it is his or her turn to speak.

The speaking database may comprise, for example, an audio-visual database of recorded speech. The database may be organized in a variety of ways. The database may include segments of audio-visual speech of a person reading text that includes an audio and video component. Thus, during times of listening, speaking or transition, the system searches the speaking database and selects segments of matching visual prosody patters from the database and the system controls the virtual agent movements according to the movements of the person recorded in the selected audio-visual recorded speech segments. In this manner, the user can experience a more realistic and natural movement of the virtual agent.

In another aspect of the invention, the speaking behavior database is not utilized and a model is used for determining virtual agent movements according to speech data. The model may be automatically trained or be handcrafted. Using the model approach, however, provides a different means of determining virtual agent movement based on speech data than the look-up speaking database. Similar models may be employed for listening movements as well as transition movements. Thus, there are a variety of different ways wherein a system can associate and coordinate virtual agent movement for speaking, listening and transition segments of a human-computer dialog.

A conversation control module 128 controls the interaction between the text generation module 126 (voice and content of virtual agent) and receiving the text or speech data from the user 102. These modules preferably exist and are operational on a computer server or servers. The particular kind of computer device or network on which these modules run is immaterial to the present invention. For example, they may be on an intranet, or the Internet or operational over a wireless network. Those of skill in the art will understand that other dialog modules are related to the conversation module. These modules include an automatic speech recognition module, a spoken language understanding module, a dialog management module, a presentation module and a text-to-speech module.

Figure 4A:
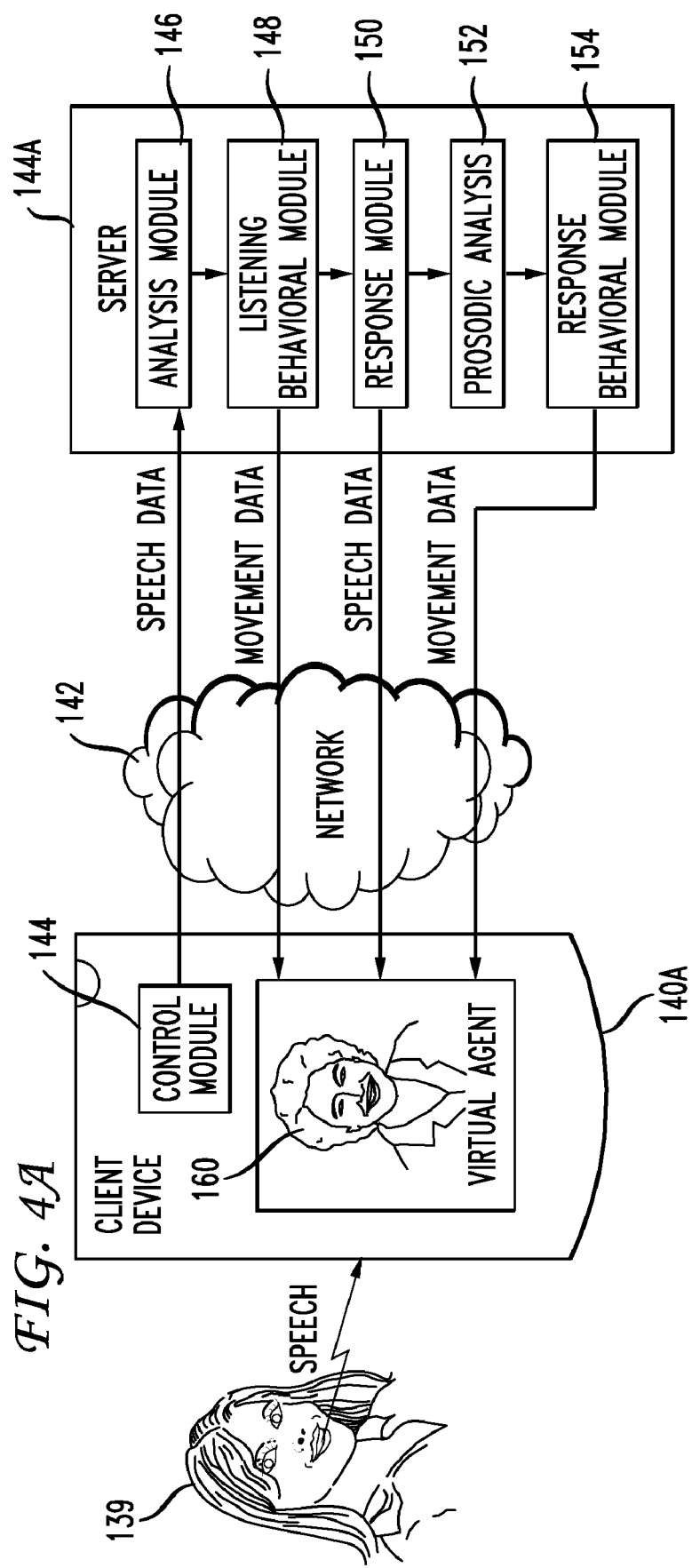
FIG. 4A illustrates an exemplary client/server-based virtual agent model over a network.

FIG. 4A illustrates an aspect of the invention in a network context. This aspect relates to a client/server configuration over a packet network, Internet Protocol network, or the Internet 142. Further, the network 142 may refer to a wireless network wherein the client device 140 transmits via a wireless protocol such as Bluetooth, GSM, CDMA, TDMA or other wireless protocol to a base station that communicates with the server 144A. U.S. Pat. No. 6,366, 886 B1, incorporated herein by reference, includes details regarding packet networks and ASR over packet networks.

In FIG. 4A, the prosodic analysis for both the virtual agent listening, transition, and response mode is performed over the network 142 at a server 144A. This may be the requirement where the client device is a small hand-held device with limited computing memory capabilities. As an example of the communication in this regard, the client device includes means for receiving speech from a user 139. This, as will be understood by those of skill in the art, may comprise a microphone and speech processing, voice coder and wireless technologies to enable the received speech to the transmitted over the network 142 to the server 144A. A control module 141 handles the processes required to receive the user speech and transmit data associated with the speech across the network 142 to the server 144A.

The server 144A includes a prosodic analysis module 146 that analyzes the prosodic elements of the received speech. According to this prosodic analysis, in real-time, a listening behavior module 148 in the server 144A transmits data associated with controlling the head movements of the virtual agent 160. Thus, while the user 139 speaks to the virtual agent 160, it appears that the agent is "listening." The listening behavior includes any behavior up to and through a transition from listening to preparing to speak. Therefore, data transmitted as shown in module 148 includes transition movements from listening to speaking.

Figure 4B:
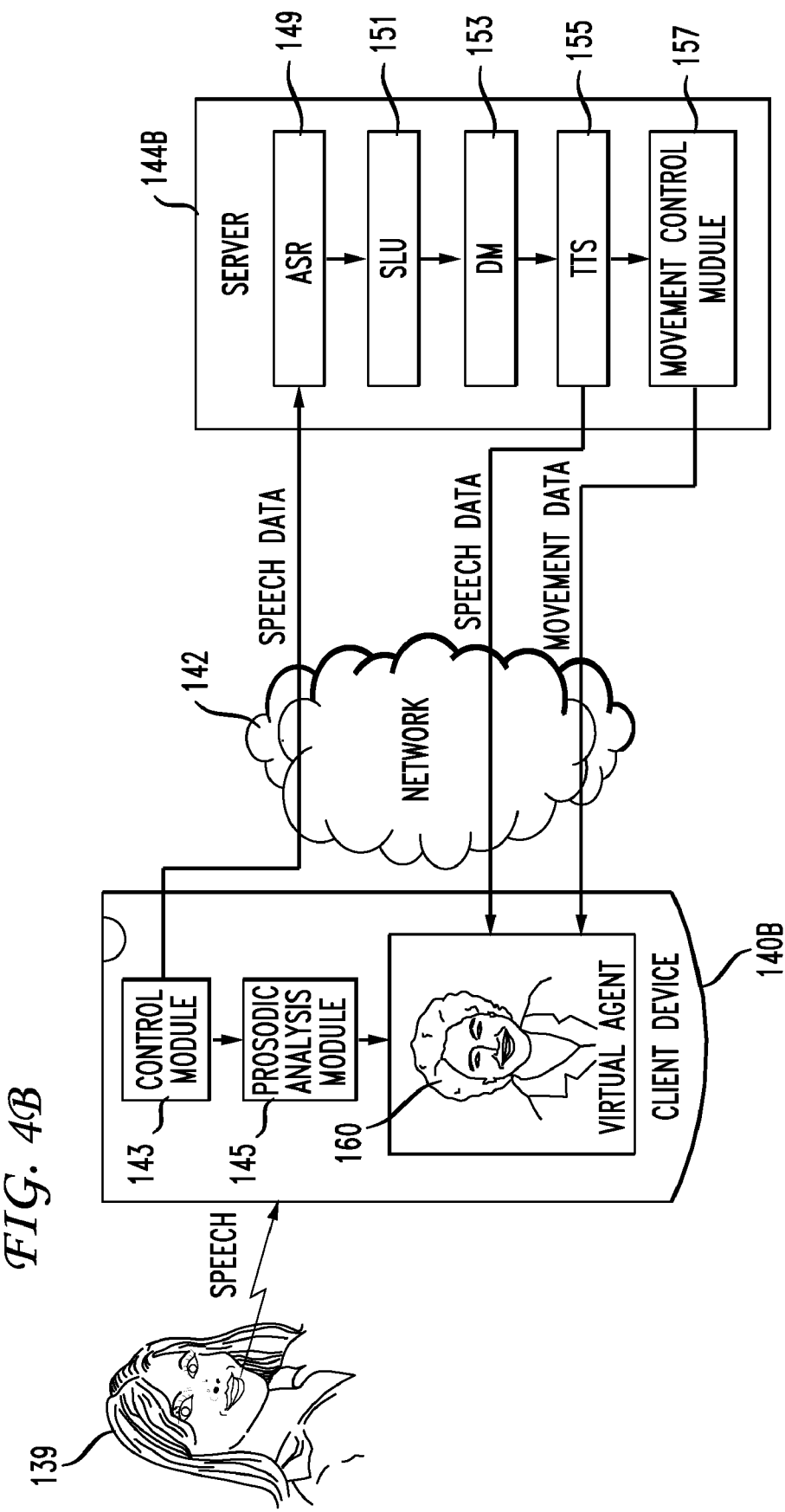
FIG. 4B illustrates another aspect of the client/server-based virtual agent model over a network.

Next, a response module 150 generates a response to the user's speech or question. The response, as is known in the art, may be generated according to processes performed by an automatic speech recognition module, a spoken language understanding module, a dialog manager module, a presentation manager, and/or a text-to-speech module. (FIG. 4B shows these modules in more detail). As the response is transmitted to the client device 140A over the packet network 150, the server 144A performs a prosodic analysis on the response 152 such that the client device 140A receives and presents the appropriate real-time responsive behavior such as facial movements and expressions 154 of the virtual agent 160 associated with the text of the response.

A realistic conversation, including the visual experience of watching a virtual agent 160 on the client device 140A, takes place between the user and the virtual agent 160 over the network 142.

The transmission over a network 142 such as a packet network is not limited to cases where prosody is the primary basis for generating movements. For example, in some cases, the virtual agent 160 responses are preprogrammed such that the response and the virtual agent 160 motion are known in advance. In this case, then the data associated with the response as well as the head movements are both transmitted over the network 142 in the response phase of the conversation between the user and the virtual agent 160.

FIG. 4B illustrates another aspect of the network context of the present invention. In this case, the client device 140B includes a control module 143 that receives the speech from the user 139. The control module transmits the speech over the network 142 to the server 144B. Concurrently, the control module transmits speech data to a prosodic analysis module 145. The listening behavior is controlled in this aspect of the invention on the client device 140B. Accordingly, while the person 139 is speaking, the modules on the client device 140B control the prosodic analysis, movement selection, and transition movement. By locally processing the listening behavior of the virtual agent 160, a more real-time experience is provided to the user 139. Further, this isolates the client device and virtual agent listening behavior from network transmission traffic slow-downs.

The server 144B performs the necessary processing to carry on a dialog with the user 139, including automatic speech recognition 149, spoken language understanding 151, dialog management 153, text-to-speech processing 155, and prosodic analysis and virtual agent movement control 157 for the response of the virtual agent 160.

The present aspects of the invention are not limited to the specific processing examples provided above. The combination of prosodic analysis and other ASR, SLU, DM and TTS processes necessary to carry out a spoken and visual dialog with the user 139 may be shared in any combination between the client device 140B and the server 144B.

In another aspect of the invention not shown in FIG. 4B, the prosodic analysis module can control the virtual agent movement both for when the virtual agent listens and speaks. In this variation of the invention, preferably, the prosodic analysis module 145 on the client device receives and analysis the TTS speech data from the server 144B. The movement of the virtual agent 160 while the virtual agent is speaking or transitioning from speaking to listening or listening to speaking is thus entirely controlled by software operating on the client device 140B. The movement control module 157 on the server may or may not be operative or exist in this aspect of the invention since all movement behavior is processed locally.

Recording real people and correlating their behavior with the prosodic information in the text enables the automation of the process of generating facial expressions and head movements. Prosodic information can be extracted reliably from text without the need of a high-level analysis of the semantic content. Measurements confirm a strong correlation between prosodic information and behavioral patterns. This is true for the correlation between behavioral patterns and the text spoken by a person, but also for the correlation between text spoken by one person and the behavioral patterns of the listener.

Accents within spoken text are prime candidates for placing prominent head movements. Hence, their reliable identification is of main interest here. Stress within isolated words has been compiled in lexica for many different languages. Within continuous speech, however, the accents are not necessarily placed at the location of the lexical stress. Context or the desire to highlight specific parts of a sentence may shift the place of an accent. It is therefore necessary to consider the whole sentence in order to predict where accents will appear.

Any interruption of the speech flow is another event predestined for placing head or facial movements. Many disfluencies in speech are unpredictable events, such as a speaker's hesitations. 'ah' or 'uh' are often inserted spontaneously into the flow of speech. However, other short interruptions are predictably placed at phrase boundaries. Prosodic phrases, which are meaningful units, make it easier for the listener to follow. That is why prosodic phrase boundaries often coincide with major syntactic boundaries and punctuation marks. FIG. 5 shows the types of boundaries predicted by the prosody tool, and how often they appear in the text. With each phrase boundary, a specific type of pitch movement is associated. This is of special interest here since it allows, for example, adding a rise of the head to a rising pitch. Such synchronizations can give a virtual agent the appearance of actually 'understanding' the text being spoken by the virtual agent. Identifying these types of boundaries can further provide the real-time appearance of actively listening to the speaking user.

As shown in FIG. 5, column 190 illustrates the pitch accents, such as H*, and column 192 shows the corresponding number of events for the data set of 1075 sentences. Column 194 shows the phrase boundary such as L-L % and the corresponding column 196 shows the number of events in the data set.

FIG. 6 illustrates the phonetic transcription and prosodic annotation of the sentence "I'm your virtual secretary." Column 200 illustrates the time until the end of the phone. Column 202 shows the corresponding phone. Column 204 shows the prosodic event, where applicable for a phone.

Column 206 illustrates the associated word in the sentence to the time, phone and prosodic event of the other three columns.

In this case, the phone durations in column 200 were extracted from the spoken text with a phone-labeling tool. Alternatively, the prosody analysis tools can predict phone durations from the text. Accents are shown here at the height of the last phone of a syllable, but it has to be understood that the syllable as a whole is considered accented and not an individual phone.

Of the different accent types, the H* accents strongly dominate (compare FIG. 2). Moreover, the prediction of the other types of accents is not very reliable. Studies show that even experienced human labelers agree in less than 60% on the accent types. Therefore the present invention does not differentiate between the various types of pitch accents and lump them all together simply as accents.

The prosody predictor according to research associated with the present invention has been trained with ToBI hand labels for 1,477 utterances of one speaker. The accent yes/no decision is correct in 89% of all syllables and the yes/no decision for phrase boundaries in 95%. The accent types are predicted correctly in 59% of all syllables and the boundary types in 74% of all cases. All the speakers recorded are different from the speaker used to train the prosody predictor. One voice can be used as well to train for prosody prediction.

Associated with the present invention is gathering data on face recognition from human readers. Natural head and facial movements while reading text provide the information for generating the head movements of a virtual agent. Hence, when using a pronounce text. It is preferable that no sensors on the person's head be used while gathering the human data. The natural features of each human face are used since no markers or other artifacts for aiding the recognition systems are used.

In an exemplary data gathering method, recordings are done with the speaker sitting in front of a teleprompter, looking straight into a camera. The frame size is 720×480 pixels and the head's height is typically about ⅔ of the frame height. The total of the recordings corresponds to 3 hours and 15 minutes of text. Facial features are extracted from these videos and head poses for each of over 700,000 frames. Recordings may be done at, for example, 60 frames per second.

In order to determine the precise head movements as well as the movements of facial parts, the positions of several facial feature points must be measured with a high accuracy. A face recognition system according to the present invention proceeds in multiple steps, each one refining the precision of the previous step. See, e.g., "Face Analysis for the Synthesis of Photo-Realistic Talking Head," Graf, H. P., Cosatto, E. and Ezzat, T., *Proc. Fourth IEEE Int. Conf. Automatic Face and Gesture Recognition*, Grenoble, France, IEEE Computer Society, Los Alamitos, 2000, pp. 189-194.

Figure 7:
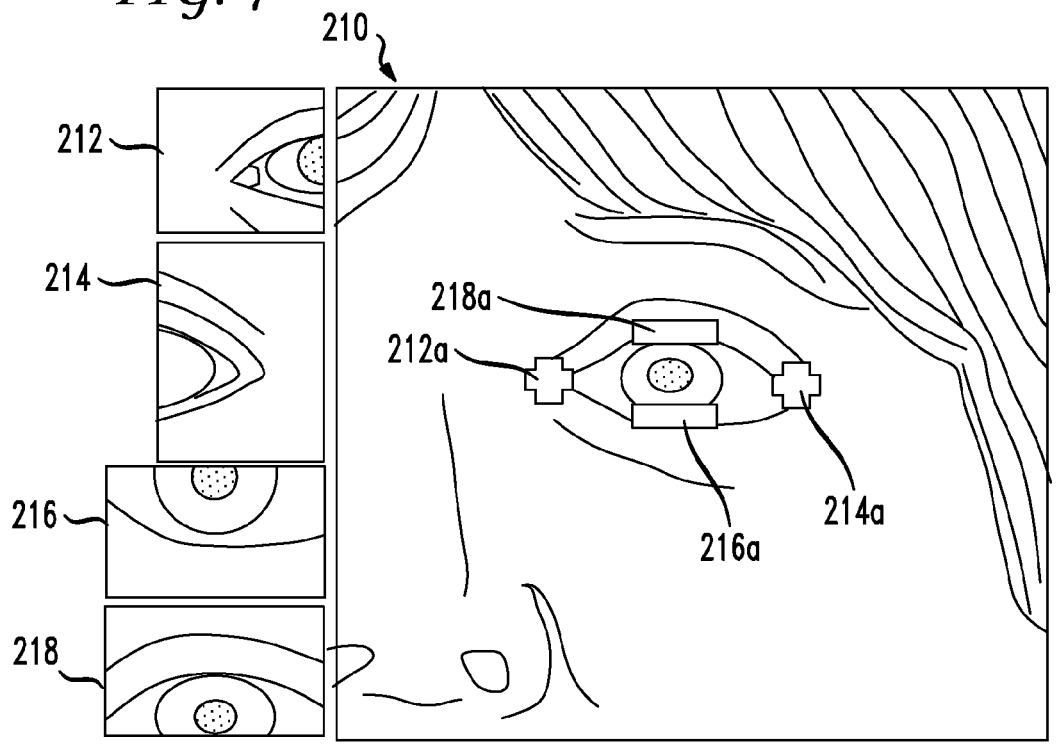
FIG. 7 illustrates an example of determining precise head movements for a virtual agent.

Using motion, color and shape information, the head's position and the location of the main facial features are determined first with a low accuracy. Then, smaller areas are searched with a set of matched filters, in order to identify specific feature points with high precision. FIG. 7 shows an example of this process using a portion of a virtual agent face 210. Representative samples of feature points may comprise, for example, eye corners 212 and 214 with corresponding points 212a and 214a on the image 210 and eye edges 216 and 218 with corresponding reference points 216a and 218a on the image 210. These images 212, 214, 216 and 218 are cut from image 210. By averaging three of these images and band-pass filtering the result, these sample images or kernels become less sensitive to the appearance in one particular image. Such sample images or filter kernels are scanned over an area to identify the exact location of a particular feature, for example, an eye corner. A set of such kernels is generated to cover the appearances of the feature points in all different situations. For example, nine different instances of each mouth corner are recorded, covering three different widths and three different heights of the mouth.

When the system analyzes a new image, the first steps of the face recognition, namely shape and color analysis, provide information such as how wide open the mouth is. One can therefore select kernels of mouth corners corresponding to a mouth of similar proportions. Image and kernels are Fourier transformed for the convolution, which is computationally more efficient for larger kernels. In this way a whole set of filter kernels is scanned over the image, identifying the feature points.

Figure 8:
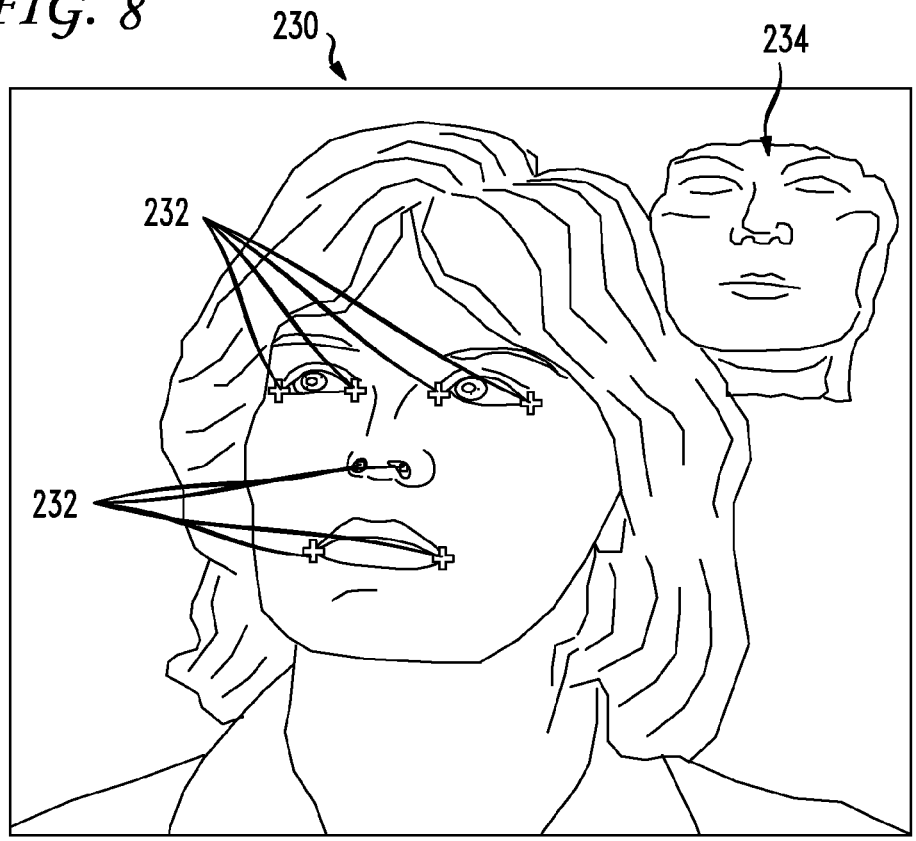
FIG. 8 shows the feature points on a virtual agent.

The head pose is calculated from the location of the eye corners and the nostrils in the image. FIG. 8 shows an example of identified feature points 232 in the image and a synthetic face model 234 in the same pose. Under these conditions, the accuracy of the feature points 323 must be better than one pixel; otherwise the resulting head pose may be off by more than one degree, and the measurements become too noisy for a reliable analysis.

There is a tradeoff between accuracy and selectivity of the filters. Larger filter kernels tend to be more accurate, yet they are more selective. For example, when the head rotates, the more selective filters are useable over a smaller range of orientations. Hence, more different filters have to be prepared. Preferably, the system typically tunes the filters to provide an average precision of between one and one and a half pixels. Then the positions are filtered over time to improve the accuracy to better than one pixel. Some events, for example eye blinks, can be so rapid that a filtering over time distorts the measurements too much. Such events are marked and the pose calculation is suspended for a few frames.

Beside the head pose, the present invention focuses on the positions of the eyebrows, the shape of the eyes and the direction of gaze. These facial parts move extensively during speech and are a major part of any visual expression of a speaker's face. They are measured with similar filters as described above. They do not need to be measured with the same precision as the features used for measuring head poses. Whether eyebrows move up one pixel more or less does not change the face's appearance markedly.

The first part of our face analysis, where the head and facial parts are measured with a low accuracy, works well for any face. Sufficient redundancy is built into the system to handle even glasses and beards. The filters for measuring feature positions with high accuracy, on the other hand, are designed specifically for each person, using samples of that person's face.

For identifying prosodic movements, the rotation angles of the head around the x-, y-, and z-axis are determined, together with the translations. FIG. 9 shows the orientation of the coordinate system used for these measurements. For example, ax, ay, az mark the rotations around the x, y, z axes.

All the recorded head and facial movements was added spontaneously by the speakers while they were reading from the teleprompter. The speakers were not aware that the head movements would be analyzed. For most of the recordings the speakers were asked to show a 'neutral' emotional state.

For the analysis, each of the six signals representing rotations and translations of the head are split into two frequency bands: (1) 0-2 Hz: slow head movements and (2) 2 Hz-15 Hz: faster head movements associated with speech.

Movements in the low frequency range extend over several syllables and often over multiple words. Such movements tend to be caused by a change of posture by the speaker, rather than being related to the speech. FIGS. 10A-10C are examples of the head angle ax as a frequency of time. FIG. 10A shows a graph 250 of the original signal 252 and a low-pass filtered signal 254. The time on the horizontal axis is given in frame numbers with 30 frames a second.

The faster movements, on the other hand, are closely related to the prosody of the text. Accents are often underlined with nods that extend typically over two to four phones. This pattern is dearly visible in FIG. 10B. In this graph 260, the data 262 represents the high-pass filtered part of the original signal 254 in FIG. 10A. The markings in FIG. 10B represent phone boundaries with frame numbers at the top of the graph. Phones and prosodic events are shown below the graph. Here the nods are very clearly synchronized with the pitch accents (positive values for angle ax correspond to down movements of the head). Typical for visual prosody, and something observed for most speakers, is that the same motion—in this case a nod—is repeated several times. Not only are such motion patterns repeated within a sentence, but often over an extended period of time; sometimes as much as whole recording session, lasting about half an hour.

A further characteristic feature of visual prosody is the initial head movement, leading into a speech segment after a pause. FIG. 10B shows this as a slight down movement of the head (ax slighdy positive) 164, followed by an upward nod at the start of the sentence 266. While developing the present invention, the applicant recorded 50 sentences of the same type of greetings and short expression in one recording session. The speaker whose record is shown in FIGS. 10A-10B executed the same initial motion pattern in over 70% of these sentences.

In FIGS. 10A-10C, only the rotation around the x-axis, ax, is shown. In this recording the rotation ax, i.e. nods, was by far the strongest signal. Many speakers emphasize nods, but rotations around the y-axis are quite common as well, while significant rotations around the z-axis are rare. A combination of ax and ay, which leads to diagonal head movements, is also observed often.

The mechanics for rotations around each of the three axes are different and, consequently, the details of the motion patterns vary somewhat. Yet, the main characteristics of all three of these rotations are similar and can be summarized with three basic patterns:
1. Nod, i.e. an abrupt swing of the head with a similarly abrupt motion back. Nod with an overshoot at the return, i.e. the pattern looks like an 'S' lying on its side.
2. Abrupt swing of the head without the back motion. Sometimes the rotation moves slowly, barely visible, back to the original pose, sometimes it is followed by an abrupt motion back after some delay.

Summarizing these patterns, where each one can be executed around the x-, y-, or z-axis:
 ^ nod (around one axis)
 ~ nod with overshoot
 / abrupt swing in one direction Having such motion primitives allows describing head movements with the primitives' types, amplitudes and durations. This provides a simple framework for characterizing a wide variety of head movements with just a few numbers. Table 1 shows some statistical data of the appearance of these primitives in one part of the text database. This illustrates the percentage of pitch accents accompanied by a major head movement. The text corpus associated with this table was 100 short sentences and greetings.

TABLE 1

| | |
|---|---|
| $P(\hat{\ }_x \mid *)$ | 42% |
| $P(\sim_x \mid *)$ | 18% |
| $P(/_x \mid *)$ | 20% |

The amplitudes of the movements can vary substantially, as is illustrated by the graph 270 in FIG. 10C. For this recording the speaker was asked to articulate the same sentence as in FIG. 10B, but with a cheerful expression. The initial head motion is a wide down and up swing of the head 274, which runs over the first nod seen in FIG. 10B. The first nod falls down on the second accent 176 and the sentence ends with an up-down swing 178.

The patterns described here are not always visible as clearly as in the graphs of FIG. 10A-10C. Some speakers show far fewer prosodic head movements than others. The type of text also influences prosodic head movements. When reading paragraphs from the Wall Street Journal, the head movements were typically less pronounced than for the greeting sentences. On the other hand, when speakers have to concentrate strongly, while reading a demanding text, they often exhibit often very repetitive prosodic patterns.

Head and facial movements during speech exhibit a wide variety of patterns that depend on personality, mood, content of the text being spoken, and other factors. Despite large variations from person to person, patterns of head and facial movements are strongly correlated with the prosodic structure of the text. Angles and amplitudes of the head movements vary widely, their timing shows surprising consistency. Similarly, rises of eyebrows are often placed at prosodic events, sometimes with head nods, at other times without. Visual prosody is not nearly as rigidly defined as acoustic prosody, but is clearly identifiable in the speech of most people.

Recent progress in face recognition enables an automatic registration of head and facial movements and opens the opportunity to analyze them quantitatively without any intrusive measuring devices. Such information is a key ingredient for further progress in synthesizing naturally looking talking heads. Lip-sound synchronization has reached a stage where most viewers judge it as natural. The next step of improvement lies in realistic behavioral patterns. Several sequences were synthesized where the head movements consisted of concatenations of the motion primitives described above. With good motion-prosody synchronization the heads look much more engaging and even give the illusion that they 'understand' what they articulate and actively listen to the speaker.

Prosody prediction tools exist for several languages and the present invention is applicable to any language for which such tools are available. Even if there are no prosody tools available for a particular language, it may be possible to generate one. Typically the generation of a prosody prediction tool is much simpler than a language understanding tool. If no good prosody prediction tools exist, many prosodic elements can still be predicted from the syntactic structure of the text. Therefore the concept of visual prosody is applicable to any language.

In another aspect of the invention, it is noted that the basic elements of prosody such as pauses, pitch, rate or relative duration, and loudness, are culturally driven in that different cultures will attach different meanings to prosodic elements. Accordingly, an aspect of this invention is to provide a system and method of adapting prosodic speaking, transition and listening movements of a virtual agent that adapt to the appropriate culture of the speaker.

Further gradations may include differences in dialect or accents wherein the prosodic responses may be different, for example, between a person from New York City and Georgia.

Figure 11:
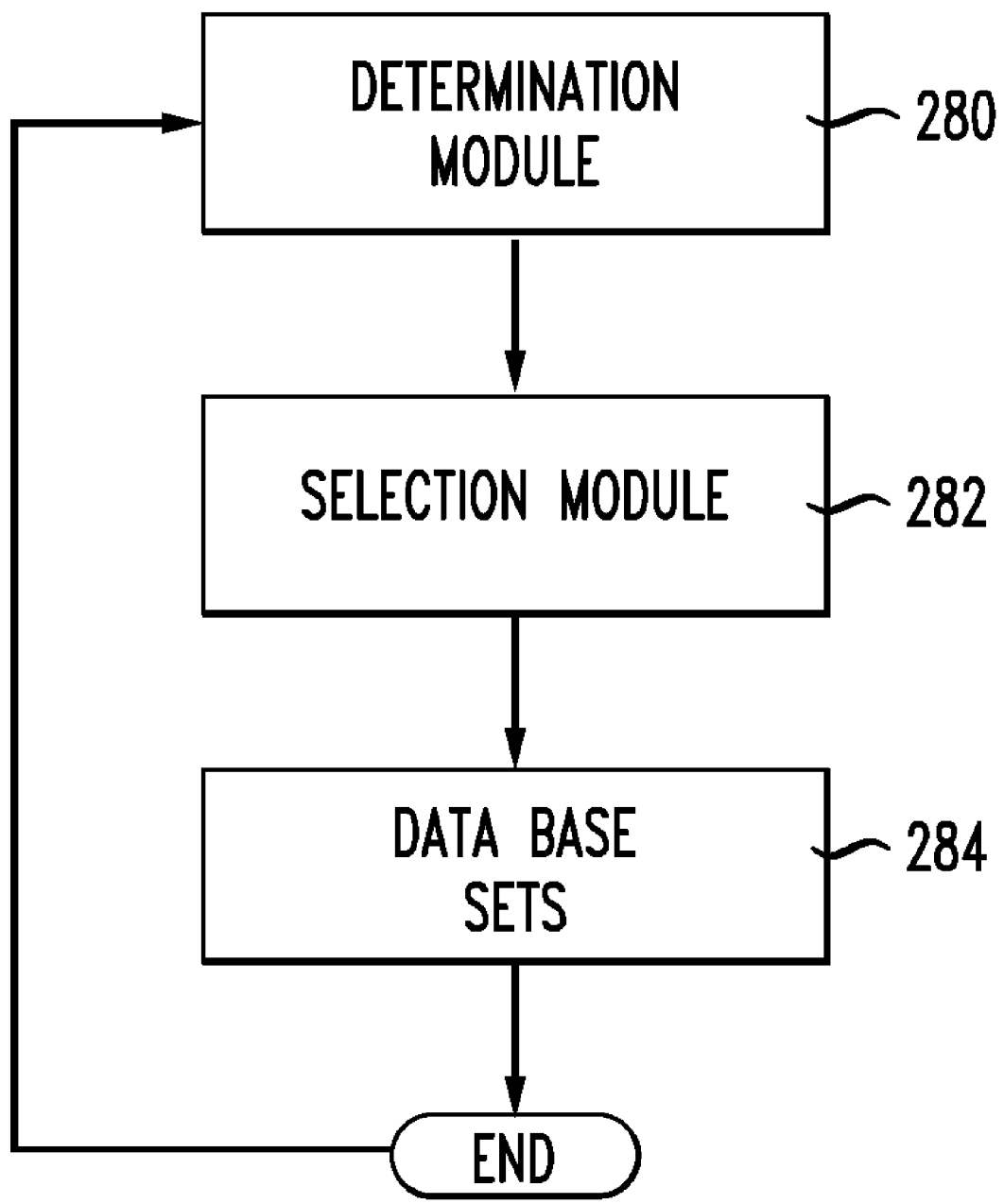
FIG. 11 illustrates a method of changing databases of virtual agent movements according to culture or language.

In this embodiment of the invention, a database of speaking, transition, and listening movements as described above is compiled for each set of cultural possibilities. For example, an English set is generated as well as a Japanese set. As shown in FIG. 11, a language determination module will determine the language of the speaker (280). This may be via speech recognition or via a dialog with the user wherein the user indicates what language or culture is desired.

Suppose the speaker selects Japanese via the determination module. The system then knows that to enable a natural looking virtual agent in the conversation using the prosodic nature of the speech it will receive, that the appropriate set of spealdng, listening and transition databases must be selected. An example of such a change may be that the virtual agent would bow at the culturally appropriate times in a conversation wherein if the user is from a different culture than those agent movements would not be displayed during the conversation. A selection module then selects that appropriate set of databases (282) for use in the conversation with the speaker.

The system proceeds then to modify, if necessary, the prosodic-driven movements of the virtual agent according to the selected databases (284) such that the Japanese user will experience a more natural conversation. The system also operates dynamically wherein if the user part-way through a conversation switches to English, ends the conversation (288), or indicates a different cultural set, then the process returns to the determining language module for making that switch (280), and then continuing to select the appropriate set of databases for proceeding with the conversation with the user.

The number of databases is only limited by the storage space. Databases for Spanish, English with a New York Accent, English with a Southern Accent, Japanese, Chinese, Arabic, French, Senior Citizen, Teenager, Ethnicity, etc. may be stored and ready for the specific cultural movement that will appeal most to the particular user.

Although the above description may contain specific details, they should not be construed as limiting the claims in any way. Other configurations of the described embodiments of the invention are part of the scope of this invention. For example, any electronic communication between people where an animated entity can deliver the message is contemplated. Email and instant messaging have been specifically mentioned above, but other forms of communication are being developed such as broadband 3G and 4G wireless technologies wherein animated entities as generally described herein may apply. Further, visual prosody contains a strong personality component and some trademark movements may be associated with certain personalities. The system can be trained to exhibit prosodic behavior of a particular person or one that is considered more 'generic'. Accordingly, the appended claims and their legal equivalents should only define the invention, rather than any specific examples given.

We claim:

1. A method of providing user-specific animated entity movements during a conversation with a user, the method comprising:
   determining a parameter associated with a culture of a user;
   based on the parameter, selecting data associated with listening movements of an animated entity based on the user's culture; and
   controlling listening movement of the animated entity when the animated entity is listening to the user based on the selected data and a prosodic analysis of user's speech such that the listening movement of the animated entity is consistent with the user's culture.

2. The method of providing user-specific animated entity movements during a conversation with the user of claim 1, wherein the parameter associated with the user is further associated with a language spoken by the user.

3. The method of providing user-specific animated entity movements during a conversation with the user of claim 1, wherein the parameter associated with the user is further associated with an age of the user.

4. The computer-readable medium of claim 1, wherein the parameter associated with the user is further associated with a dialect spoken by the user.

5. The computer-readable medium of claim 1, wherein the parameter associated with the user is further associated with an ethnicity of the user.

6. A computing device for providing user-specific animated entity movements during a conversation with a user, the computing device comprising:
   a module configured to determine a parameter associated with a culture of a user;
   a module configured to, based on the parameter, select data associated with listening movements of an animated entity based on the user's culture; and
   a module configured to control listening movement of the animated entity when the animated entity is listening to the user based on the selected data and a prosodic analysis of user's speech such that the listening movement of the animated entity is consistent with the user's culture.

7. The computing device of claim 6, wherein the parameter associated with the user is further associated with a language spoken by the user.

8. The computing device of claim 6, wherein the parameter associated with the user is further associated with an age of the user.

9. The computing device of claim 6, wherein the parameter associated with the user is further associated with a dialect spoken by the user.

10. The computing device of claim 6, wherein the parameter associated with the user is further associated with an ethnicity of the user.

11. A computer-readable medium storing instructions for controlling a computing device to provide user-specific animated entity movements during a conversation with a user, the instructions comprising:
    determining a parameter associated with a culture of a user;
    based on the parameter, selecting data associated with listening movements of an animated entity based on the user's culture; and
    controlling listening movement of the animated entity when the animated entity is listening to the user based on the selected data and a prosodic analysis of user's speech such that the listening movement of the animated entity is consistent with the user's culture.

12. The computer-readable medium of claim 11, wherein the parameter associated with the user is further associated with a language spoken by the user.

13. The computer-readable medium of claim 11, wherein the parameter associated with the user is further associated with an age of the user.

14. A method of controlling virtual agent listening movement, the method comprising:
receiving speech data from the user;
performing a prosodic analysis of the speech data;
based on the prosodic analysis, selecting matching prosody patterns from a listening database;
determining a culture associated with a user; and
controlling virtual agent listening movement according to the prosodic analysis and further based on data associated with the determined culture of the user.

15. The method of claim 14, wherein the prosodic analysis further comprises using a model to determine what virtual agent movement to associate with the speech data.

* * * * *